United States Patent [19]

Draexler

[11] Patent Number: 4,551,392

[45] Date of Patent: Nov. 5, 1985

[54] COMPOSITE MATERIALS AND COMPOSITE BUILDING ELEMENTS BASED ON EP(D)M

[75] Inventor: Adolf Draexler, Marl, Fed. Rep. of Germany

[73] Assignee: Chemische Werke Huels Aktiengesellschaft, Marl, Fed. Rep. of Germany

[21] Appl. No.: 619,448

[22] Filed: Jun. 11, 1984

[30] Foreign Application Priority Data

Jun. 11, 1983 [DE] Fed. Rep. of Germany ....... 3321176

[51] Int. Cl.$^4$ .................... B32B 27/08; B32B 25/12
[52] U.S. Cl. .................................. 428/495; 428/519; 428/520; 428/516; 156/305; 156/333; 156/334; 156/338
[58] Field of Search ............... 428/495, 493, 519, 516, 428/520

[56] References Cited

U.S. PATENT DOCUMENTS

| 3,653,423 | 4/1972 | Paddock | 428/519 X |
| 3,681,306 | 8/1972 | Wehner | 526/90 X |
| 4,095,033 | 6/1978 | Küepper | 526/308 X |
| 4,153,748 | 5/1979 | Bischoff | 428/519 X |

*Primary Examiner*—Patrick C. Ives
*Attorney, Agent, or Firm*—Millen & White

[57] ABSTRACT

Composite materials and composite building elements have two layers:
(1) a layer obtained from a vulcanizable composition based on EP(D)M and
(2) a layer obtained from a vulcanizable composition based on an elastomer component consisting of 5–50% by weight of a polyoctenylene elastomer and 50–95% by weight of an elastomer, or several elastomers, selected from the group of SBR, NBR, CM and the diene elastomers.

The strength of the interlayer bond attained by vulcanization welding is good to excellent.

15 Claims, No Drawings

COMPOSITE MATERIALS AND COMPOSITE BUILDING ELEMENTS BASED ON EP(D)M

BACKGROUND OF THE INVENTION

Composite materials and composite building elements based on EP(D)M are conventional. Normally, they comprise three layers:

1. a layer based on EP(D)M; this layer is resistant to heat and ozone and exhibits swelling (solvent) resistance against polar, organic media;
2. a layer based on an elastomer component imparting to this layer a particular, desired property, for example, flame retardance or swelling (solvent) resistance against nonpolar, organic media; and
3. an intermediate layer based on an elastomer component having good capability for covulcanization with EP(D)M, on the one hand, and the elastomer component of the other layer, on the other hand, or a fabric interlayer.

The composite materials and composite construction elements of the prior art, although having a satisfactorily strong interlayer bond obtained by vulcanization welding, are cumbersome in their manufacture and thus expensive. This is primarily because of the requirement of the intermediate layer.

SUMMARY OF THE INVENTION

Accordingly, it is an object of this invention to provide composite materials and composite construction elements based on EP(D)M which can be obtained in simplified fashion, e.g., without the need for an interlayer to effect a bond.

It is another object of this invention to provide such materials and elements which have satisfactory strength of the interlayer bond obtained by vulcanization welding.

Upon further study of the specification and appended claims, further objects and advantages of this invention will become apparent to those skilled in the art.

These objects have been attained surprisingly by providing composite materials and composite building elements comprising layers obtained from vulcanizable compositions of different elastomer components wherein (1) one layer is obtained from a composition comprising EP(D)M as the elastomer component, an effective amount of a vulcanizing agent, and customary additives, and (2) the adjoining layer is obtained from a composition comprising an elastomer or several elastomers selected from the group of SBR, NBR, CM and the diene elastomers as the elastomer component, an effective amount of a vulcanizing agent, and customary additives, wherein (3) the elastomer component described in feature (2) comprises, 5-50% by weight of a polyoctenylene elastomer having a viscosity number (J value) of 40-350 cc/g, measured at 25° C. in toluene in a concentration of 0.5% (weight/volume of solution), and 50-95% by weight of an elastomer or several (two or more) elastomers selected from the group of SBR, NBR, CM and the diene elastomers.

Preferred such materials and elements have an elastomer component according to feature (2) comprising 10-30% by weight of a polyoctenylene elastomer having a J value of 80-200 cc/g, and 70-90% by weight of an elastomer or several elastomers selected from the group of SBR, NBR, CM and the diene elastomers.

DETAILED DISCUSSION

The elastomer symbols used herein are fully conventional (The Synthetic Rubber Manual, $9^{th}$ edition (1983), II SRP; CM=chlorinated polyethylene).

The terpolymer component D in the ethylene-propylene terpolymer EPDM can be, e.g., ethylidene norbornene, 1,4-hexadiene, or dicyclopentadiene. Suitable EP(D)M components are of an amorphous type, a sequence type, or a mixed type. Suitable preparative methods for and compositions and properties of the EP(D)M are very well known (The Synthetic Rubber Manual, whose disclosure is incorporated by reference herein). Typical EPDM elastomers contain up to 15 double bonds per 1,000 carbon-atoms. Typically, the thickness ratio of the EP(D)M layer to the other layer will be non-critical; generally, it will be in the range of 1:10 to 10:1.

Examples of suitable diene elastomers are NR, IR, BR, CR and copolymers of dienes, e.g. copolymers of 1,3-butadiene and isoprene. They are well known (The Synthetic Rubber Manual).

Suitable SBR, NBR and CM type elastomers are well known (The Synthetic Rubber Manual). The chlorine content of the CM type elastomers generally is 25 to 45 weight percent. Mixtures of such elastomers can also be used. The ratio of the elastomer components in the mixtures depends on their compatibility.

Suitable polyoctenylene elastomers can have predominantly trans-double bonds (TOR; the usual commercial grades exhibit 80 or 62% of trans-double bonds) or predominantly cis-double bonds (COR). COR is preferred. With COR a stronger interlayer bond attained by vulcanization welding can be obtained than with TOR. Polyoctenylene elastomers with differing proportions of cis- and trans-double bonds, i.e., different contents of cis- and trans-octenylene units, as well as varying J values and correspondingly differing molecular weights, are preparable by methods known from the literature, e.g. U.S. Pat. No. 4,095,033, whose disclosure is incorporated by reference herein.

Suitable vulcanizing agents are any of the known vulcanizing systems. Preferred vulcanizing systems contain sulfur in combination with conventional accelerators. Other preferred vulcanizing systems are those containing conventional peroxides. The amount of vulcanizing agents in each layer depends on the respective requirements and compositions and can be readily conventionally determined by simple orientation experiments. Preferably, the same vulcanizing agent, e.g., sulfur, will be used in each layer.

Suitable conventional additives include, for example, customary fillers, e.g., active, reinforcing fillers, e.g., carbon blacks of various activities and active silicic acids, or inactive fillers, e.g., chalks and silicates; customary plasticizer oils, e.g., aromatic, aliphatic, and naphthenic hydrocarbons; and the usual auxiliary agents, e.g., age retarders, ozone protection waxes, mold release agents, tackifying resins etc. Amounts of each additive can be conventionally determined.

Polyoctenylene elastomers are well compatible with other elastomers. They also improve the phase dispersity in blends of less compatible elastomers, i.e., they enhance the specific interface area. In this connection, they normally also improve the covulcanization of the less compatible elastomers. Furthermore, ordinarily they enhance the heat and UV resistances of the vulcanizates produced therewith, i.e., the layer according to features 2 and 3 above.

Preparation of the composites of this invention is fully conventional. That is, in order to produce the vulcanizable compositions and for their further processing into composite materials and composite building elements, i.e., to form the vulcanizates, the usual mixing, shaping, and vulcanizaion installations can be employed. These are well known in the rubber industry, and include, for example, internal mixers, rolling mills, extruders, calenders, injection molding devices, vulcanizing presses, continuously operating crosslinking units, etc. The composites of this invention are especially useful for elastic gaskets, gasoline hoses and the like.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In these examples, parts (p) mean parts by weight. The comparative examples which are not according to this invention are denoted by capital letters.

A commercially available polyoctenylene elastomer was utilized below and had a proportion of trans-double bonds of 62%. Its J value was 130 ml/g.

The EPDM employed was an amorphous grade. The terpolymer component D was ethylidene norbornene (14 double bonds/1,000 carbon atoms). Its Mooney viscosity ($ML_{1+4}$, 100° C., DIN [German Industrial Standard] 53 523) was 90.

The EPM utilized was an amorphous type having a Mooney viscosity of 70.

The NBR used was commercially available and had a weight ratio of acrylonitrile/1,3-butadiene of 28/72 and a Mooney viscosity of 65.

The commercial CM used contained 36% by weight of Cl. Its Mooney viscosity was 30.

EXAMPLES A and 1

Layer I was obtained from a vulcanizable composition (compound) corresponding to the following formulation:
100 p EPDM
5 p zinc oxide
1 p stearic acid
60 p carbon black N 550
20 p paraffinic oil
1.5 p sulfur
0.5 p mercaptobenzothiazole
0.6 p tetramethylthiuram disulfide
1.0 p zinc dibutyldithiocarbamate Layer II was obtained from the compounds according to the following formulations:

|  | Example A | Example 1 |
| --- | --- | --- |
| NR (smoked sheets) | 100 p | 80 p |
| Polyoctenylene elastomer | — | 20 p |
| Zinc oxide | 5 p | 5 p |
| Stearic acid | 2 p | 2 p |
| Carbon black N 550 | 50 p | 50 p |
| 2,2'-Methylenebis(4-methyl-6-tert-butylphenol) | 0.5 p | 0.5 p |
| Sulfur | 2.5 p | 2.5 p |
| Benzothiazyl 2-cyclohexylsulfenamide | 0.8 p | 0.8 p |
| Tetramethylthiuram monosulfide | 0.05 p | 0.12 p |

The layers each had a thickness of 4 mm.

Layers I and II were welded together under the crosslinking conditions of 15 min/160° C. The test specimens A and 1 were cut from the thus-obtained sheets with the dimensions of 25×150×8 mm. They were characterized by the peeling test according to DIN 53 539. The separating force required for separating the layers [N/mm width of specimen] was:
Test specimen A: 1.5 N/mm
Test specimen 1: 4.0 N/mm

EXAMPLES B and 2

Layer I the same as in Examples A and 1.
Layer II was obtained from the compounds corresponding to the following formulations:

|  | Example B | Example 2 |
| --- | --- | --- |
| NBR | 100 p | 80 p |
| Polyoctenylene elastomer | — | 20 p |
| Zinc oxide | 5 p | 5 p |
| Stearic acid | 1.5 p | 1.5 p |
| Carbon black N 550 | 50 p | 50 p |
| Aromatic oil | 10 p | 10 p |
| Sulfur | 2 p | 2 p |
| Benzothiazyl 2-cyclohexylsulfenamide | 1.6 p | 1.6 p |
| Tetramethylthiuram monosulfide | 0.1 p | 0.15 p |

The test specimens obtained as in the above examples yielded the following values in the peeling test:
Test specimen B: 0.2 N/mm
Test specimen 2: 4.1 N/mm

EXAMPLES C and 3

Layer I was obtained from the compound as set out in the following formulations:
100 p EPM
5 p zinc oxide
1 p stearic acid
60 p carbon black N 550
20 p paraffinic oil
1 p polymeric 1,2-dihydro-2,2,4-trimethylquinoline
6 p 1,3-bis(tert-butylperoxyisopropyl)benzene Layer II was obtained from the compounds according to the following formulations:

|  | Example C | Example 3 |
| --- | --- | --- |
| NBR | 100 p | 80 p |
| Polyoctenylene elastomer | — | 20 p |
| Zinc oxide | 5 p | 5 p |
| Stearic acid | 0.5 p | 0.5 p |
| Carbon black N 550 | 50 p | 50 p |
| Naphthenic oil | 5 p | 5 p |
| Polymeric 1,2-dihydro-2,2,4-trimethylquinoline | 1 p | 1 p |
| 1,3-Bis(tert-butylperoxy- | 4.5 p | 4.5 p |

-continued

|  | Example C | Example 3 |
|---|---|---|
| isopropyl)benzene |  |  |

The test specimens, obtained as in the above examples, resulted in the following value in the peeling test:
Test specimen C: 2.9 N/mm
Test specimen 3: 12.8 N/mm

EXAMPLES D and 4

Layer I as in Examples C and 3.
Layer II was obtained from the compounds corresponding to the following formulations:

|  | Example D | Example 4 |
|---|---|---|
| CM | 100 p | 80 p |
| Polyoctenylene elastomer | — | 20 p |
| Magnesium oxide | 5 p | 5 p |
| Carbon black N 550 | 50 p | 50 p |
| 1,3-Bis(tert-butylperoxy-isopropyl)benzene | 5 p | 5 p |
| Triallyl cyanurate | 1.5 p | 1.5 p |

The test specimens, obtained as in the above examples, showed the following values in the peeling test:
Test specimen D: 2.9 N/mm
Test specimen 4: 4.9 N/mm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composite material comprising the following two layers:
   (1) a layer comprising an ethylene/propylene or ethylene/propylene/diene elastomer and an effective amount of a vulcanizing agent; and
   (2) an adjoining layer comprising an elastomer component comprising 5–50% by weight of a polyoctenylene elastomer having a viscosity number (J value) of 40–350 cc/g, measured at 25° C. in tolune in a concentration of 0.5% (weight/volume of solution), and
   50–95% by weight of one or more elastomers selected from the group of styrene/butadiene rubber, acrylonitrile/butadiene rubber, chlorinated polyethylene and diene elastomers,
   and an effective amount of a vulcanizing agent.

2. A composite material of claim 1 which has been vulicanized.

3. A composite material of claim 2 wherein one or both layers contain conventional additives.

4. A composite material of claim 3 wherein both layers contain additives.

5. A coposite material of claim 2 wherein the elastomer component in said adjoining layer (2) comprises 10–30% by weight of a polyoctenylene elastomer having a J value of 80–200 cc/g, and 70–90% by weight of one or more elastomers selected form the group of styrene/butadiene rubber acrylonitrile/butadiene rubber, rubber chlorianted polyethylene and diene elastomers.

6. A composite material of claim 2 wherein the elastmer in layer (1) is ethylene/propylene rubber.

7. A composite material of claim 2 wherein the elastomer in layer (1) is ethylene/propylene/diene elastomer.

8. A composite material of claim 7 wherein the diene in said ethylene/propylene/diene elastomer is ethylidene norbornene, 1,4-hexadiene or dicyclopentadiene.

9. A composite material of claim 2 wherein said diene elastomer is natural rubber, isoprene rubber, butadiene rubber, polychloroprene, or a 1,3-butadiene/isoprene copolymer.

10. A composite material of claim 2 wherein the polyoctenylene elastomer has predominantly trans-double bonds.

11. A composite material of claim 2 wherein the polyoctenylene elastomer has predominantly cis-double bonds.

12. A composite material of claim 2 wherein the vulcanizing agent comprises sulfur and an accelerator.

13. A composite material of claim 2 wherein the vulcanizing agent comprises a peroxide.

14. A composite material of claim 4 wherein each layer further comprises a filler, a plasticizer oil, an age retarder, an ozone protection wax, a mold release agent or an adhesion promoter.

15. In a composite building element comprising a composite material having at least two elastomer layers, the improvement wherein the composite material is that of claim 2.

* * * * *